Sept. 9, 1930.  R. O. BOYKIN  1,775,154
PROCESS OF EXTRACTING OIL FROM COTTON SEED
Filed Dec. 8, 1925
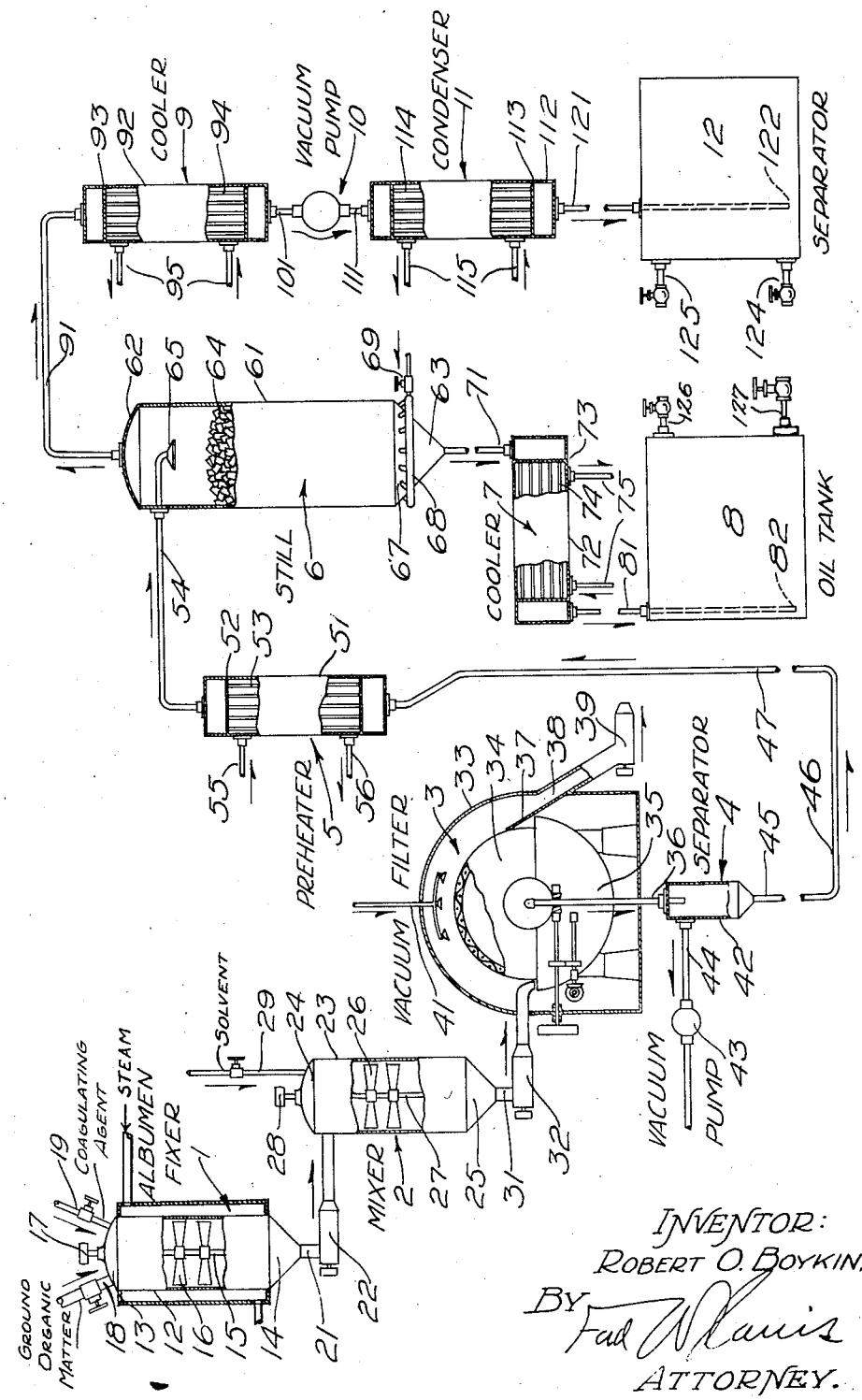
INVENTOR:
ROBERT O. BOYKIN.
BY
ATTORNEY.

Patented Sept. 9, 1930

1,775,154

UNITED STATES PATENT OFFICE

ROBERT O. BOYKIN, OF LOS ANGELES, CALIFORNIA, ASSIGNOR TO N. RUSSELL VAIL, OF LOS ANGELES, CALIFORNIA

PROCESS OF EXTRACTING OIL FROM COTTONSEED

Application filed December 8, 1925. Serial No. 74,005.

My invention relates to the art of separating oil from organic matter, and it comprises a novel process in which the oil is expeditiously extracted from the organic matter. Solely for the purpose of illustration I elect to show and describe my invention as being used for treating cottonseed-meal and extracting oil therefrom, but I do not intend to limit my invention to this one embodiment since it is applicable to use upon other oil-bearing matter.

In the process of extracting oil from cottonseed, it is common practice to grind the seed and to mix it with a solvent in order to dissolve the oil from the solid constituents of the seed. The pregnant oil (solvent carrying dissolved oil) is then extracted from the solids of the meal, usually by a vacuum filter, and the pregnant solvent is then treated to separate it into organic oil and solvent.

I have found that the pregnant solvent is not separated from the solids as rapidly as it might be, by the vacuum filter, by reason of the presence of glutinous or colloidal substances which clog the vacuum filter. These glutinous substances are albumin or proteins in most cases.

I have discovered that the cottonseed-meal can be treated to render these glutinous substances insoluble or granular so that they are non-adhesive and non-colloidal. Cottonseed-meal, thus treated, may have pregnant solvent more quickly and efficiently separated from the solids.

It is therefore an object of this invention to provide an extraction process which is superior to others because of its quicker and more efficient operation.

It is another object of this invention to provide a process of this character in which the organic matter is so treated that glutinous substances are coagulated and made insoluble and granular.

Other objects and advantages of this invention will appear in the following description.

Referring to the drawing in which I diagrammatically illustrate an apparatus for conducting my invention, 1 is a fixer, 2 is a mixer, 3 is a vacuum filter, 4 is a separator, 5 is a pre-heater, 6 is a still, 7 is an oil cooler, 8 is an oil tank, 9 is a vapor cooler, 10 is a vacuum pump, 11 is a condenser and 12 is a condensate separator.

The fixer 1 consists of a shell 12 having a top 13 and a conical bottom 14. Extending vertically through the shell 12 is a shaft 15 having mixing paddles 16 secured thereto. The upper end of the shaft 15 extends through the top 13 of the fixer 1 and has a pulley 17 secured thereto by means of which the shaft 15 is driven and the paddles 16 are rotated. Ground organic matter is supplied to the fixer 1 through a pipe 18 and a coagulating agent is supplied to the fixer 1 by a pipe 19, the pipes 18 and 19 connecting with the interior of the shell 12 through the top 13. The paddles 16 operate to thoroughly mix the organic meal with the coagulating agent. The coagulating agent acts upon the glutinous substances of the meal and coagulates or converts these glutinous substances into insoluble and non-adhesive granules.

The meal is taken from the fixer 1 through a pipe 21 and is delivered to the mixer 2. The pipe 21 is provided with a suitable screw feed 22. The mixer 2 consists of a shell 23 having a tight top 24 and a conical bottom 25. Mixing paddles 26 are placed inside the shell 23, being secured upon and operated by a shaft 27. The shaft 27 extends from the interior of the shell 23 through the top 24 and has a pulley 28 secured at the extending end thereof by means of which the shaft 27 may be rotated. Solvent is supplied to the mixer 2 by a solvent pipe 29 which connects to the interior of the shell 23 through the top 24. This solvent may be benzol, naphtha or any suitable hydrocarbon with a boiling point of from 120° to 250° F. and a specific gravity of approximately 0.725. The organic meal is supplied to the interior of the shell 23 through the pipe 21 which connects near the upper part of the shell 23. In the mixer 2 the meal is thoroughly mixed by means of the mixing paddles 26 with a solvent which is introduced into the shell 23 by means of the solvent pipe 29. The solvent dissolves the organic oil from the meal during the mixing process and forms a pregnant solvent.

The meal and pregnant solvent are taken from the mixer 2 by means of a pipe 31 and are delivered thereby to the filter 3. This pipe 31 connects to the mixer 2 at the cone bottom 25. A screw feed 32 is provided in the pipe 31 for conveying the meal and solvent from the mixer 2 to the filter 3. The filter 3 consists of a housing 33 in which a filter drum 34 is rotatably mounted. This filter drum 34 is of standard construction and the peripheral wall thereof is formed of a porous or pervious member. The lower portion of the filter drum 34 passes through a tank 35 into which the meal and pregnant solvent are delivered by the pipe 31.

A vacuum is placed on the interior of the drum 34 by means of a pipe 36 which extends to the separator 4. Therefore, as the filter drum 34 rotates, the meal and solvent are drawn onto it, by reason of the suction on the interior thereof, in a thin layer. The vacuum on the interior of the drum 34 is effective in drawing the pregnant solvent from the meal or the solid constituents of the organic matter. The insoluble granules which are formed from the glutinous substances of the organic matter form a part of the solids which remain on the filter drum 34. A scraper 37 engages the periphery of the drum 34 and removes the solid constituents of the meal therefrom. The meal and the granules are directed through a chute 38 and are delivered by means of a screw feed 39 to a suitable storage or for further treatment. A rewash solvent may be sprayed on the thin layer of organic meal on the drum 34 for rewashing same and assuring that all of the oil is removed therefrom, which rewash solvent may be supplied through a spray pipe 41.

The pipe 36 extends into the upper end of a shell 42 of the separator 4. A vacuum pump 43 connects to the upper end of the shell 42 by means of a pipe 44, by means of which vacuum pump 43 a vacuum is placed on the interior of the drum 34. The pregnant solvent taken from the solid constituents of the organic matter is drawn through the pipe 36 by the vacuum created by the vacuum pump 43 and is delivered to the shell 42. The pregnant solvent passes from the shell 42 through a pipe 45 which connects to the lower end thereof. This pipe 45 extends down a short distance and is connected to a horizontal pipe 46 which connects to a vertical pipe 47.

The pipe 47 extends to the preheater 5 and is connected to the lower end of a shell 51 thereof. The shell 51 is provided with intermediate heads 52 between which pipes 53 extend. The pregnant solvent is drawn through the pipes 45, 46 and 47 into the preheater 5 by means of a vacuum which is created by the vacuum pump 10. The manner of connection of this vacuum pump 10 to the apparatus will be described shortly.

From the foregoing description it will be seen that the vacuum pump 10 provides a vacuum which causes the pregnant solvent to flow through the pipes 45, 46 and 47 through the preheater 5 and into the still 6. The pipe 47 is of sufficient height so that oil cannot be entirely drawn therefrom. Therefore, there will always be a body of oil at the lower end of the pipes 47 and 45 which provides a vacuum seal which prevents vacuum in both the preheater 5 and the still 6 from being destroyed. The pregnant solvent passes into a space at the lower end of the shell 51 and through the pipes 53 into a space at the upper end of the shell 51 and passes from the preheater 5 through a pipe 54. Steam or other heating agent is supplied to the interior of the shell 51 between the heads 52 and around the pipes 53 by means of a pipe 55 and is taken therefrom by means of a pipe 56.

The pregnant solvent is thus heated in the preheater 5 to a temperature which is higher than the boiling point of the solvent. When benzol is used, the temperature to which the pregnant solvent is raised in the preheater 5 is approximately 176° F.

The pipe 54 conveys the heated pregnant solvent to the still 6. The still 6 consists of a shell 61 which has a tight top 62 and a conical bottom 63. This shell 61 is filled with a multiplicity of ferrules or short lengths of pipe 64 which are placed in the shell 61 and allowed to have any position which they may occupy. The pipe 54 extends through the upper part of the shell 61 and has a perforated nozzle 65 provided at the end thereof which extends into the shell 61. Pregnant solvent is drawn in spray form through the perforated nozzle 65 onto the ferrules 64. The ferrules 64 are of various lengths and diameters and provide a very large surface over which the pregnant solvent flows. This forms the solvent into thin films and exposes a maximum area of surface of the pregnant solvent. Steam preferably at a temperature of about 350° F. is admitted into the bottom of the still 6 through a plurality of nozzles 67 which connect to a steam manifold 68, which manifold is supplied with steam by means of a pipe 69. The steam passes into the interior of the shell 61 and rises therethrough in a direction opposite to that of the pregnant solvent which is flowing downwardly in the shell 61. In its upward passage the steam is brought into intimate contact with the pregnant solvent raising its temperature and causing a rapid evaporation of the solvent therefrom so that the liquid which reaches the bottom of the still 6 consists of oil which is substantially free from solvent and free from deleterious substances.

The oil is taken from the bottom 63 of the still 6 by means of a pipe 71 which connects to one end of a shell 72 of the oil cooler 7. The shell 72 is provided with intermediate heads 73 between which pipes 74 are connected. A cooling medium is supplied to and taken from the space inside the shell 72 between the heads 73 and around the pipes 74 by means of pipes 75. The oil passes from the pipe 71 into the space at one end of the shell 72 through the pipes 74 and into a space at the other end of the shell 72. The pipe 71 is of sufficient height to prevent oil from being drawn upward therethrough by the vacuum created by the vacuum pump 10 even with a perfect vacuum in the still 6. The oil in its passage through the oil cooler 7 is considerably lowered in temperature.

A pipe 81 connects with the end of the shell 72 opposite from the end with which the pipe 71 connects, and extends to the interior of an oil tank 8. The pipe 81 has an end 82 which is arranged near the bottom of the oil tank 8 so that it is kept submerged. By keeping the lower end 82 of the pipe 81 submerged a vacuum seal for the bottom of the still 6 is provided allowing oil to be delivered to the oil tank 8 without breaking the vacuum on the still 6.

The steam passing upward through the shell 61 and the solvent vapors which are evaporated from the pregnant solvent are drawn from the shell 61 by a pipe 91 which connects to the head 62 of the still 6. The pipe 91 delivers the vapors to the vapor cooler 9. The vapor cooler 9 consists of a shell 92 having intermediate heads 93 between which pipes 94 extend. A cooling medium is supplied to and taken from the space in the shell 92 between the heads 93 and around the pipes 94 by pipes 95. The pipe 91 is connected to the upper end of the shell 92 and delivers vapors into a space at the upper end thereof. The vapors pass through the pipes 94 to a space at the lower end of the shell 92, the vapors being considerably reduced in temperature and partially condensed when passing through the vapor cooler 9.

The cooled vapors are delivered to the vacuum pump 10 by a pipe 101 which connects to the lower end of the shell 92 and to the vacuum pump 10. The cooled vapors are taken from the vacuum pump 10 by means of a pipe 111 and are delivered to the condenser 11.

The condenser 11 consists of a shell 112 having intermediate heads 113 between which heads 113 pipes 114 extend. A condensing medium is supplied to the space between the heads 113 and around the pipes 114 by means of pipes 115. The pipe 111 connects with a space provided at the upper end of the shell 112 into which space the cooled vapors are passed. The cool vapors thereafter pass through the pipes 114 and into a space formed at the lower end of the shell 112. The vapors are condensed into a liquid as they pass through the condenser 11. The condensates are taken from the lower end of the condenser 11 by means of a pipe 121 and are delivered thereby to a condensate separator 12.

The steam condensates or water and the solvent condensates separate by gravity in the condensate separator 12. The water is drawn from the separator 12 by a pipe 124 and condensed solvent is drawn from the separator 12 by a pipe 125.

The temperature in the interior of the still 6 is maintained sufficiently high by introduction of steam at its lower end so that the pregnant solvent trickling downward through the still 6 is at all times heated to a temperature above the boiling point of the solvent. A certain amount of steam condenses into water in the still 6 and passes downward with the oil into the oil tank 8. Here the oil and water stratify, permitting them to be easily drawn off separately by suitable valved decanting pipes 126 and 127 respectively which are provided at different levels in a side wall of the tank 8.

In the practice of my invention I prefer to use calcium hydrate as a coagulating agent since it is effective in thoroughly coagulating albumins and other glutinous substances. The albumin may, of course, be rendered insoluble by the use of other coagulants or by heating, for instance, by cooking for fifteen to forty minutes in a steam jacketed vessel carrying a steam pressure of from 20 to 100 lbs., without departing from the broad spirit of my invention. Other chemical coagulants which may be used in place of calcium hydrate with satisfactory results are strontium hydroxide water, strong sodium chloride or calcium chloride brine or acetic acid. The strengths of such reagents should be adjusted to the characteristics of the materials operated on, which the ordinary chemist can well do. The clogging of the filter 3 is done away with by such coagulation and the thoroughness and rate of filtration is increased. The glutinous material which in previous processes would clog the porous material of the filter drum and greatly impede its operation is entirely converted into a coagulated condition. This part of my invention is an important advance in the art; since the filtration may take place more rapidly, and the organic matter may be more efficiently acted upon in the filter 3.

I desire to use benzol as a solvent because its boiling point is much lower than that of organic oil, and it may therefore be readily separated from the oil subsequent to filtration.

By heating the pregnant solvent and separating the solvent and oil in a high vacuum, I am able to carry certain undesirable constituents away in the solvent vapor and I am able to prevent a breaking down of the oil which, as is well known, would form fatty acids and other deleterious substances.

The undesirable constituents of the oil referred to above which are carried from the oil in the solvent vapor are generally of unknown composition. These undesirable compounds include certain amino acids, and they are generally very odoriferous and in the past have required a special deodorizing process in order to extract them from the oil.

It is especially desirable to apply the process of this invention to the extraction of cottonseed oil from raw comminuted cottonseed. As an example of the application of this process to cottonseed, the process may be carried out with the following proportions of the various materials involved. The cottonseed is first ground to a meal, 95% of which will pass through a 200-mesh screen, and one part of this meal is mixed with .01 to .02 of a part of powdered calcium hydrate. When the calcium hydrate has been thoroughly mixed with the meal, 1.25 parts of a suitable solvent, which may be benzol, is added to the mixture of meal and calcium hydrate and the solvent is thoroughly mixed with the meal. The pregnant solvent is then filtered from the mixture and the solvent and oil separated in the manner described above.

It has been found advantageous in filtering the pregnant solvent from the meal to wash the meal by spraying as high as 1.75 parts of solvent upon the cake as it revolves on the filter drum 34. This insures the removal of all the cottonseed oil which is present in the meal.

While my invention is particularly adapted for use in the extraction of oil from cottonseed, it may also be used with any organic material, and particularly with seeds of plants, such as beans and cocoanuts.

I claim as my invention:

1. A continuous process of separating cottonseed oil from raw comminuted cottonseed which consists in adding a chemical albumin coagulating agent to said raw, comminuted cottonseed so as to fix the albumins in said cottonseed in insoluble non-adhesive granules, adding benzol to said cottonseed to dissolve said cottonseed oil which is disposed in the interstices between said granules, filtering said oil dissolved in benzol from said cottonseed, and separating said benzol and said oil.

2. A continuous process of separating cottonseed oil from raw comminuted cottonseed which consists in adding calcium hydrate to said raw, comminuted cottonseed so as to fix the albumins in said cottonseed in insoluble non-adhesive granules, adding benzol to said cottonseed to dissolve said cottonseed oil which is disposed in the interstices between said granules, filtering said oil dissolved in benzol from said cottonseed, and separating said benzol and said oil.

3. A continuous process of separating cottonseed oil from raw comminuted cottonseed which consists in adding a chemical albumin coagulating agent to said raw, comminuted cottonseed so as to fix the albumins in said cottonseed in insoluble non-adhesive granules, adding a low-boiling-point oil solvent insoluble in water to said cottonseed to dissolve said cottonseed oil which is disposed in the interstices between said granules, filtering said oil dissolved in said solvent from said cottonseed, spreading said pregnant solvent containing the dissolved oil in a thin film in contact with steam for vaporizing said solvent, said steam being at a temperature and pressure sufficient to vaporize said solvent but at which no substantial vaporization of said oil will occur, withdrawing and condensing said vaporized solvent, and removing said oil from contact with said steam.

In testimony whereof, I have hereunto set my hand at Los Angeles, California, this 2nd day of December, 1925.

ROBERT O. BOYKIN.